(12) United States Patent
Walker et al.

(10) Patent No.: US 10,934,469 B2
(45) Date of Patent: Mar. 2, 2021

(54) WATER SWELLABLE LOST CIRCULATION MATERIALS

(71) Applicant: Halliburton Energy Services, Inc., Houston, TX (US)

(72) Inventors: Jonathan Paul Walker, Cypress, TX (US); Matthew Lynn Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/515,981

(22) PCT Filed: Nov. 21, 2014

(86) PCT No.: PCT/US2014/066918
§ 371 (c)(1),
(2) Date: Mar. 30, 2017

(87) PCT Pub. No.: WO2016/081012
PCT Pub. Date: May 26, 2016

(65) Prior Publication Data
US 2018/0230360 A1 Aug. 16, 2018

(51) Int. Cl.
*C09K 8/502* (2006.01)
*C09K 8/514* (2006.01)
(Continued)

(52) U.S. Cl.
CPC .............. *C09K 8/502* (2013.01); *C09K 8/514* (2013.01); *E21B 33/138* (2013.01); *C09K 8/487* (2013.01)

(58) Field of Classification Search
CPC ........ C09K 8/487; C09K 8/502; E21B 33/138
See application file for complete search history.

(56) References Cited

U.S. PATENT DOCUMENTS

| 4,191,254 A | 3/1980 | Baughman et al. |
| 4,635,726 A * | 1/1987 | Walker .................... E21B 21/16 166/294 |

(Continued)

FOREIGN PATENT DOCUMENTS

| CA | 1259788 | 9/1989 |
| WO | 2014011071 | 1/2014 |

OTHER PUBLICATIONS

Willet et al, "Reactive Extrusion of Starch—Polyacrylamide Graft Copolymers Using Various Starches", Journal of Polymers and the Environment, (2006), 14:125-129.*

(Continued)

*Primary Examiner* — Frances Tischler
(74) *Attorney, Agent, or Firm* — Tenley Krueger; C. Tumey Law Group PLLC (57) ABSTRACT

Lost circulation compositions, systems, and methods of using the same are described. A lost circulation composition comprises a water-swellable starch graft copolymer; and a carrier fluid. A method for bridging a lost circulation zone comprises providing a lost circulation composition comprising a water-swellable starch graft copolymer and a carrier fluid. Then introducing the lost circulation composition into a wellbore within a subterranean formation, wherein the subterranean formation comprises a lost circulation zone. Finally the lost circulation composition is placed into the lost circulation zone.

11 Claims, 3 Drawing Sheets

(51) Int. Cl.
*E21B 33/138* (2006.01)
*C09K 8/487* (2006.01)

(56) References Cited

U.S. PATENT DOCUMENTS

| | | | |
|---|---|---|---|
| 5,132,285 A * | 7/1992 | Tsai | C08F 251/00 |
| | | | 162/168.3 |
| 5,238,065 A * | 8/1993 | Mondshine | C09K 8/52 |
| | | | 166/300 |
| 8,017,553 B2 | 9/2011 | Doane et al. | |
| 8,376,045 B2 | 2/2013 | Sarap et al. | |
| 8,381,813 B2 | 2/2013 | Diaz et al. | |
| 9,505,972 B2 | 11/2016 | Iverson et al. | |
| 2003/0141062 A1* | 7/2003 | Cowan | C09K 8/5083 |
| | | | 166/294 |
| 2006/0047068 A1* | 3/2006 | Doane | A01G 13/02 |
| | | | 525/54.3 |
| 2006/0079408 A1* | 4/2006 | Verret | C09K 8/40 |
| | | | 507/219 |
| 2006/0137879 A1* | 6/2006 | Chan | C09K 8/52 |
| | | | 166/307 |
| 2014/0038857 A1 | 2/2014 | Millero et al. | |
| 2014/0135237 A1 | 5/2014 | Villarreal et al. | |
| 2014/0190696 A1 | 7/2014 | Iverson | |
| 2016/0333247 A1 | 11/2016 | Whitfill et al. | |

OTHER PUBLICATIONS

Australian Examination Report for Application No. 2014412029 dated Sep. 28, 2017.

Canadian Office Action for Application No. CA 1259788 dated Sep. 26, 2018.

International Search Report and Written Opinion for Application No. PCT/US2014/066918 dated Jul. 24, 2015.

* cited by examiner

WATER SWELLABLE LOST CIRCULATION MATERIALS

BACKGROUND

The disclosed examples relate to servicing a wellbore and, in particular, to the introduction of water-swellable lost circulation materials into a wellbore to reduce the loss of fluid into a subterranean formation.

A natural resource such as oil or gas residing in a subterranean formation can be recovered by drilling a well bore into the formation. A wellbore is typically drilled while circulating a drilling fluid through the wellbore. Among other things, the circulating drilling fluid may lubricate the drill bit, carry drill cuttings to the surface, and balance the formation pressure exerted on the well bore. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a well bore.

One method that has been developed to control lost circulation involves the placement of lost circulation materials into the lost circulation zone. Conventional lost circulation materials may include fibrous, lamellated, or granular materials. The lost circulation materials may be placed into the formation, inter alia, as a separate lost circulation pill in an attempt to control and/or prevent lost circulation. For a number of reasons, use of lost circulation materials may not provide a desirable level of lost circulation control in all circumstances.

BRIEF DESCRIPTION OF THE DRAWINGS

These drawings illustrate certain aspects of some of the embodiments of the present invention, and should not be used to limit or define the invention.

DESCRIPTION OF SPECIFIC EMBODIMENTS

The disclosed examples relate to servicing a wellbore and, in particular, to the introduction of water-swellable lost circulation materials into a wellbore to reduce the loss of fluid into a subterranean formation. There may be several potential advantages to the disclosed methods and compositions, only some of which may be alluded to herein. One of the many potential advantages of the methods and compositions is that the lost-circulation materials may be water-swellable. Lost circulation materials that swell in the presence of water may provide better results as compared to lost circulation materials that do not swell. Another potential advantage is that at least a portion of the lost circulation materials may be acid-soluble. Acid-soluble lost circulation materials may be removed by the introduction of acid. Removal of at least a portion of the lost-circulation materials may reduce the risk of the lost circulation materials interfering with perforations or fractures in the producing zone of a subterranean formation.

Generally, the lost circulation compositions disclosed herein may comprise a lost circulation material and a carrier fluid. The lost circulation materials may comprise a water-swellable starch graft copolymer. The water-swellable starch graft copolymer may comprise one or more monomers that have been graft polymerized onto a starch. One method of making the water-swellable starch graft copolymer may comprise graft polymerizing a monomer onto a starch in the presence of an initiator to form a starch graft copolymer, and optionally cross-linking the starch graft copolymer, for example, by adding a cross-linking gent, such as methylene bis-acrylamide to cross-link the graft copolymer. The water-swellable starch graft copolymer may be added to a carrier fluid and then used in a variety of lost circulation compositions. The water-swellable starch graft copolymer may be mixed with other types of lost circulation materials. The water-swellable graft co-polymer is water-swellable and as such, the water-swellable starch graft copolymer swells upon contact with a sufficient amount of water. The water-swellable starch graft copolymer is not settable like some types of lost-circulation materials, and may be at least partially acid-soluble. For example, the water-swellable starch graft copolymer may be up to 40% acid-soluble. Thus, the water-swellable starch graft copolymer may be used in applications where removal of at least a portion of the lost-circulation material is desirable. With the benefit of this disclosure, one having ordinary skill in the art should recognize the applications suitable for a particular lost circulation material.

The water-swellable starch graft copolymer may comprise any sufficient monomer suitable for graft polymerization onto a starch. Without limitation, example monomers suitable for the graft copolymer may include acrylic acid, methacrylic acid, acrylamide, methacrylamide, sulfonic acids such as 2-acrylamido-2-methyl-propanesulfonic acid or vinyl sulfonic acid, acrylates such as ethyl acrylate or potassium acrylate, derivatives, or combinations thereof. With the benefit of this disclosure, one having ordinary skill in the art should be able to select a monomer suitable for a water-swellable starch graft copolymer for use as a lost circulation material.

The water-swellable starch graft copolymer may comprise any sufficient starch suitable for graft polymerization of the monomer. Generally, and without limitation, this may include starches, flours, and meals. More specifically, the starches may include native starches, corn starches, waxy maize starches, wheat starches, potato starches, dextrin starches, dextran starches, corn meal, peeled yucca root, unpeeled yucca root, oat flour, banana flour, tapioca flour, the like, or combinations thereof. The starch may be gelatinized if desirable. Alternatively, other polysaccharides, such as cellulose, may be used as a substitute for starch. The weight ratio of the starch to the monomer may be in the range of between about 1:1 to about 1:6. With the benefit of this disclosure, one having ordinary skill in the art should be able to select a starch suitable for a water-swellable starch graft copolymer for use as a lost circulation material.

As discussed above, a method of producing the water-swellable starch graft copolymer may utilize an initiator to induce graft polymerization, e.g., a monomer may be graft polymerized onto a starch in the presence of an initiator. Examples of initiators may include, but should not be limited to, cerium (+4) salts such as ceric ammonium nitrate, persulfates such as ammonium persulfate, sodium persulfate, and potassium persulfate; peroxides such as ferrous peroxide and ferrous ammonium sulfate-hydrogen peroxide; L-ascorbic acid; potassium permanganate-ascorbic acid; vanadium; manganese; derivatives; or combinations thereof. The amount of initiator used may vary based on the desired initiator, the desired monomer, and the desired starch. In some examples, the initiators may require the presence of heat. The initiator may be added in a single or multiple steps, and multiple initiators may be used. With the benefit of this disclosure, one having ordinary skill in the art will be able to select an initiator suitable for producing a graft copolymer for use as a lost circulation material.

Optionally, a cross-linking agent may be added to the water-swellable starch graft copolymer to form a cross-linked water-swellable starch graft copolymer. Examples of cross-linking agents may include, but should not be limited to, glycerides, diepoxides, diglycidyls, cyclohexadiamide, methylene bis-acrylamide, bis-hydroxyalkyl amides such as bis-hydroxypropyl adipamide, formaldehydes such as urea-formaldehyde and melamine-formaldehyde resins, isocyanates including di- or tri-isocyanates, epoxy resins, derivatives, or combinations thereof. Alternative methods of cross-linking may also be employed. For example, a solid graft copolymer product may be cross-linked through irradiation, such as exposure to gamma or x-ray electromagnetic radiation, or to an electron beam and the like. Furthermore, some of the monomers discussed above may possess a self-reactive functional group or multiple self-reactive functional groups and may therefore be capable of self-cross-linking without a cross-linking agent. With the benefit of this disclosure, one having ordinary skill in the art will be able to select a cross-linking agent suitable for cross-linking a water-swellable starch graft copolymer for use as a lost circulation material.

The water-swellable starch graft copolymers may have a particle size between about 1 mesh to about 200 mesh. The desirable particle size may depend on the desired application and the specifics of the wellbore. For example, the water-swellable starch graft copolymer may have a particle size of about 1 mesh, about 5 mesh, about 10 mesh, about 20 mesh, about 50 mesh, about 100 mesh, about 150 mesh, or about 200 mesh. As used herein, all references to mesh size are based on the U.S. Sieve Series. With the benefit of this disclosure, one having ordinary skill in the art should be able to select an appropriately sized water-swellable starch graft copolymer for use as a lost circulation material.

The water-swellable starch graft copolymers may be at least partially acid soluble. As described herein, "acid-soluble" is defined as being dissolvable in an acid. An "acid" is defined as any fluid having a pH of less than 7. For example, up to about 40% of the water-swellable starch graft copolymer may be acid-soluble. The acid that may be used to dissolve the acid-soluble portions of the water-swellable starch graft copolymers may be any such acid suitable for wellbore use. Examples include, but are not limited to, hydrochloric acid and formic acid. The acid concentration may vary as desired. For example, 10-15% hydrochloric acid and/or 5-10% formic acid may be used. The acids may be pumped downhole where they may flow over the formation to remove any acid-soluble materials. With the benefit of this disclosure, one having ordinary skill in the art should be able to dissolve at least a portion of the water-swellable starch graft copolymer.

The water-swellable starch graft copolymers as well as any additional lost circulation materials, may be dispersed in a carrier fluid to produce lost circulation compositions. The carrier fluid may be a non-aqueous carrier fluid or may be saltwater (e.g., water containing one or more salts dissolved therein, seawater, brines, saturated saltwater, etc.). While water that does not contain salts or does not sufficient amount of dissolved salt may be used, it should be understood that, because the starch graft copolymer is water swellable, the water may cause premature swelling in the graft copolymer and consequently a reduction in functionality. Examples of non-aqueous carrier fluids may include any non-aqueous carrier fluid suitable for use in a wellbore. Without limitation, specific examples of carrier fluids include petroleum oil, natural oil, synthetically derived oil, mineral oil, silicone oil, kerosene oil, diesel oil, an alpha olefin, an internal olefin, an ester, a diester of carbonic acid, a paraffin, or combinations thereof. In general, the carrier fluid may be present in an amount sufficient to form a pumpable fluid. By way of example, the carrier fluid may be present in in an amount in the range of from about 50% to about 80% by weight of the lost circulation composition. In an embodiment, the carrier fluid may be present in an amount of about 60% to about 75% by weight of the lost circulation composition.

Lost circulation materials in addition to the above described water-swellable starch graft copolymer may be included in the lost circulation compositions to, for example, help prevent the loss of fluid circulation into the subterranean formation. Examples of additional lost-circulation materials that may be used include, but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls. The additional lost circulation material or materials may be blended with the water-swellable starch graft copolymer prior to combination of the blend with the carrier fluid to form the lost circulation composition.

The lost circulation materials included in the lost circulation composition may have a multi-modal particle size distribution. By way of example, the lost circulation materials may have 2, 3, 4, 5, 6, or more modal peaks. Modal peaks occur on a particle size distribution curve when there are increased particle concentrations relative to particle sizes on either side of the curve. The particle size of the lost circulation materials may be in a range of about 5 microns to about 4000 microns. With the benefit of this disclosure, one having ordinary skill in the art should be able to select a size of lost circulation material.

In some embodiments, the lost circulation compositions may further comprise a viscosifier to, for example, aid in suspending any of the lost circulation materials in the lost circulation compositions. Suitable viscosifying agents may include, but are not limited to, colloidal agents (e.g., clays such as bentonite, polymers, and guar gum), emulsion-forming agents, diatomaceous earth, biopolymers, synthetic polymers, chitosans, starches, gelatins, or mixtures thereof. The clay may include a colloidal clay, nano clay, a synthetic clay, or a combination thereof. An example of a suitable synthetic clay is Thermavis™ additive, available from Halliburton Energy Services, Inc. The viscosifier may be present in the lost circulation composition in an amount of about 0.1% to about 2% by weight of the lost circulation composition. For example, the viscosifier may be present in an amount of about 0.1%, about 0.5%, about 1%, or about 2% by weight of the lost circulation composition. One of ordinary skill in the art, with the benefit of this disclosure, should recognize the appropriate amount of viscosifier to include for a chosen application.

The lost circulation compositions may further comprise an acid-soluble filler. The acid-soluble filler may be used, for example, to provide an additional acid-soluble component so that more of the lost circulation compositions can be dissolved and removed. This may be desirable, for example, if the lost circulation composition is used in a producing zone. Examples of suitable acid-soluble fillers include dolomite, magnesium carbonate, calcium carbonate, and zinc carbonate. In an embodiment, the acid-soluble filler may include sub-micron size filler having a particle size in the range of 100 nm to 1 micron and, for example, between 200 nm to 800 nm. For example, sub micron-calcium carbonate may be used in accordance with embodiments of the present invention. The calcium carbonate may have a particle size greater than 1 micron. Where used, the acid-soluble filler may be present in the lost circulation compositions in an amount of from about 0.1% to about 300% by weight of the lost circulation materials. In an embodiment, the acid-soluble filler is present in an amount of from about 15% to about 50% by weight of the lost circulation materials. One of ordinary skill in the art, with the benefit of this disclosure, should recognize the appropriate amount of acid-soluble filler to include for a chosen application.

Other additives suitable for use in the lost circulation compositions may be used to enhance various properties of the lost circulation compositions. Examples of such additives include, but are not limited to weighting agents, lightweight additives, dispersants, fluid loss control additives, thixotropic additives, and combinations thereof. A person having ordinary skill in the art, with the benefit of this disclosure, should be able to determine the type and amount of additive useful for a particular application and desired result.

Weighting agents are typically materials that weigh more than water and may be used to increase the density of the lost circulation compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the lost circulation compositions to, for example, decrease the density of the lost circulation compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Dispersants may be included in the lost circulation compositions to, for example, disperse the lost circulation materials in the carrier fluid. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment® 5581F and Liquiment® 514L dispersants available from BASF Corporation Houston, Tex; or Ethacryl™ G dispersant available from Coatex, Genay, France. An additional example of a suitable commercially available dispersant is CFR™-3 dispersant, available from Halliburton Energy Services, Inc., Houston, Tex. The Liquiment® 514L dispersant may comprise 36% by weight of the polycarboxylated ether in water. One of ordinary skill in the art, with the benefit of this disclosure, should recognize the appropriate type of dispersant to include for a chosen application.

Thixotropic additives may be included in the lost circulation compositions to, for example, provide a lost circulation composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art should appreciate that the lost circulation compositions generally should have a density suitable for a particular application. By way of example, the lost circulation compositions may have a density in the range of from about 5 pounds per gallon ("lb/gal") to about 25 lb/gal. In certain embodiments, the lost circulation compositions may have a density in the range of from about 8 lb/gal to about 12 lb/gal and, alternatively, about 9 lb/gal to about 11 lb/gal. Those of ordinary skill in the art, with the benefit of this disclosure, should recognize the appropriate density for a particular application.

As will be appreciated by those of ordinary skill in the art, the lost circulation compositions may be used to control lost circulation. As previously mentioned, lost circulation zones are often encountered into which drilling fluid (or other well treatment fluid) circulation can be lost. As a result, drilling typically must be terminated with the implementation of remedial procedures, for example. The lost circulation compositions can be used to seal any of the lost circulation zones to prevent the uncontrolled flow of fluids into or out of the lost circulation zones, e.g., lost drilling fluid circulation, crossflows, underground blow-outs and the like. In an example, a lost circulation composition is prepared. After preparation, the lost circulation composition is introduced into the lost circulation zone. In an example, the lost circulation composition is pumped through one or more openings at the end of a drill pipe or any other piping or tubing. Once placed into the lost circulation zone, the lost circulation materials in the lost circulation compositions may bridge the lost circulation zones. The water-swellable starch graft copolymer may swell upon contact with a sufficient amount of water, thus enhancing the bridging effect of the lost circulation composition. This process should seal the zone and control the loss of subsequently pumped drilling fluid allowing for continued drilling. In addition to drilling fluids, the lost circulation compositions disclosed herein may also be used to control lost circulation problems encountered with any other fluids that may be placed into the wellbore, for example, spacer fluids, completion fluids (e.g., completion brines), fracturing fluids, and cement compositions. If removal of the lost circulation materials is desired, e.g., if the lost circulation materials interfere with a producing zone, an acid may be introduced to dissolve at least a portion of the water-soluble graft copolymer as well as any other lost circulation materials that also possess a degree of acid solubility. The dissolved portion may then be removed from the previously bridged zone.

A lost circulation composition may be provided. The lost circulation composition may include one or all of the components illustrated on FIGS. 1-3. The lost circulation composition may comprise a water-swellable starch graft copolymer; and a carrier fluid. The water-swellable starch graft copolymer may comprise at least one monomer selected from the group consisting of acrylic acid, methacrylic acid, acrylamide, methacrylamide, 2-acryl amido-2-methyl-propanesul fonic acid, vinyl sulfonic acid, ethyl acrylate, potassium acrylate, derivatives thereof, and combinations thereof. The water-swellable starch graft copolymer may comprise at least one starch selected from the group consisting of corn starches, waxy maize starches, wheat starches, potato starches, dextrin starches, dextran starches, corn meal, peeled yucca root, unpeeled yucca root, oat flour, banana flour, tapioca flour, and combinations thereof. The water-swellable starch graft copolymer may be up to about 40% acid-soluble. The water-swellable starch graft copolymer may be cross-linked. The water-swellable starch graft copolymer may have a particle size between about 1 mesh to about 200 mesh. The carrier fluid may be selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof. The carrier fluid may be present in in an amount in the range of from about 50% to about 80% by weight of the lost circulation composition. The lost circulation composition may further comprise at least one additional lost circulation material selected from the group consisting of cedar bark, shredded cane stalks, mineral fiber, mica flakes, cellophane, calcium carbonate, ground rubber, polymeric materials, pieces of plastic, grounded marble, wood, nut hulls, plastic laminates, corncobs, cotton hulls, and combinations thereof. The lost circulation composition may further comprise at least one viscosifier selected from the group consisting of colloidal agents, emulsion-forming agents, diatomaceous earth, biopolymers, synthetic polymers, chitosans, starches, gelatins, and combinations thereof.

A method for bridging a lost circulation zone may be provided. The method may include one or all of the components illustrated on FIGS. 1-3. The method may comprise providing a lost circulation composition comprising a water-swellable starch graft copolymer and a carrier fluid; introducing the lost circulation composition into a wellbore within a subterranean formation, wherein the subterranean formation comprises a lost circulation zone; and placing the lost circulation composition into the lost circulation zone. The water-swellable starch graft copolymer may comprise at least one monomer selected from the group consisting of acrylic acid, methacrylic acid, acrylamide, methacrylamide, 2-acrylamido-2-methyl-propanesulfonic acid, vinyl sulfonic acid, ethyl acrylate, potassium acrylate, derivatives thereof, and combinations thereof. The water-swellable starch graft copolymer may comprise at least one starch selected from the group consisting of corn starches, waxy maize starches, wheat starches, potato starches, dextrin starches, dextran starches, corn meal, peeled yucca root, unpeeled yucca root, oat flour, banana flour, tapioca flour, and combinations thereof. The water-swellable starch graft copolymer may be up to about 40% acid-soluble. The water-swellable starch graft copolymer may be cross-linked. The water-swellable starch graft copolymer may have a particle size between about 1 mesh to about 200 mesh. The carrier fluid may be selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof. The carrier fluid may be present in in an amount in the range of from about 50% to about 80% by weight of the lost circulation composition. The lost circulation composition may further comprise at least one additional lost circulation material selected from the group consisting of cedar bark, shredded cane stalks, mineral fiber, mica flakes, cellophane, calcium carbonate, ground rubber, polymeric materials, pieces of plastic, grounded marble, wood, nut hulls, plastic laminates, corncobs, cotton hulls, and combinations thereof. The lost circulation composition may further comprise at least one viscosifier selected from the group consisting of colloidal agents, emulsion-forming agents, diatomaceous earth, biopolymers, synthetic polymers, chitosans, starches, gelatins, and combinations thereof.

A system for bridging a lost circulation zone may be provided. The system may include one or all of the components illustrated on FIGS. 1-3. The system may comprise a lost circulation composition comprising a water-swellable starch graft copolymer and a carrier fluid; mixing equipment capable of mixing the water-swellable starch graft copolymer and the carrier fluid; and pumping equipment capable of introducing the lost circulation composition into the lost circulation zone. The water-swellable starch graft copolymer may comprise at least one monomer selected from the group consisting of acrylic acid, methacrylic acid, acrylamide, methacrylamide, 2-acrylamido-2-methyl-propanesulfonic acid, vinyl sulfonic acid, ethyl acrylate, potassium acrylate, derivatives thereof, and combinations thereof. The water-swellable starch graft copolymer may comprise at least one starch selected from the group consisting of corn starches, waxy maize starches, wheat starches, potato starches, dextrin starches, dextran starches, corn meal, peeled yucca root, unpeeled yucca root, oat flour, banana flour, tapioca flour, and combinations thereof. The water-swellable starch graft copolymer may be up to about 40% acid-soluble. The water-swellable starch graft copolymer may be cross-linked. The water-swellable starch graft copolymer may have a particle size between about 1 mesh to about 200 mesh. The carrier fluid may be selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof. The carrier fluid may be present in in an amount in the range of from about 50% to about 80% by weight of the lost circulation composition. The lost circulation composition may further comprise at least one additional lost circulation material selected from the group consisting of cedar bark, shredded cane stalks, mineral fiber, mica flakes, cellophane, calcium carbonate, ground rubber, polymeric materials, pieces of plastic, grounded marble, wood, nut hulls, plastic laminates, corncobs, cotton hulls, and combinations thereof. The lost circulation composition may further comprise at least one viscosifier selected from the group consisting of colloidal agents, emulsion-forming agents, diatomaceous earth, biopolymers, synthetic polymers, chitosans, starches, gelatins, and combinations thereof.

Figure 1:
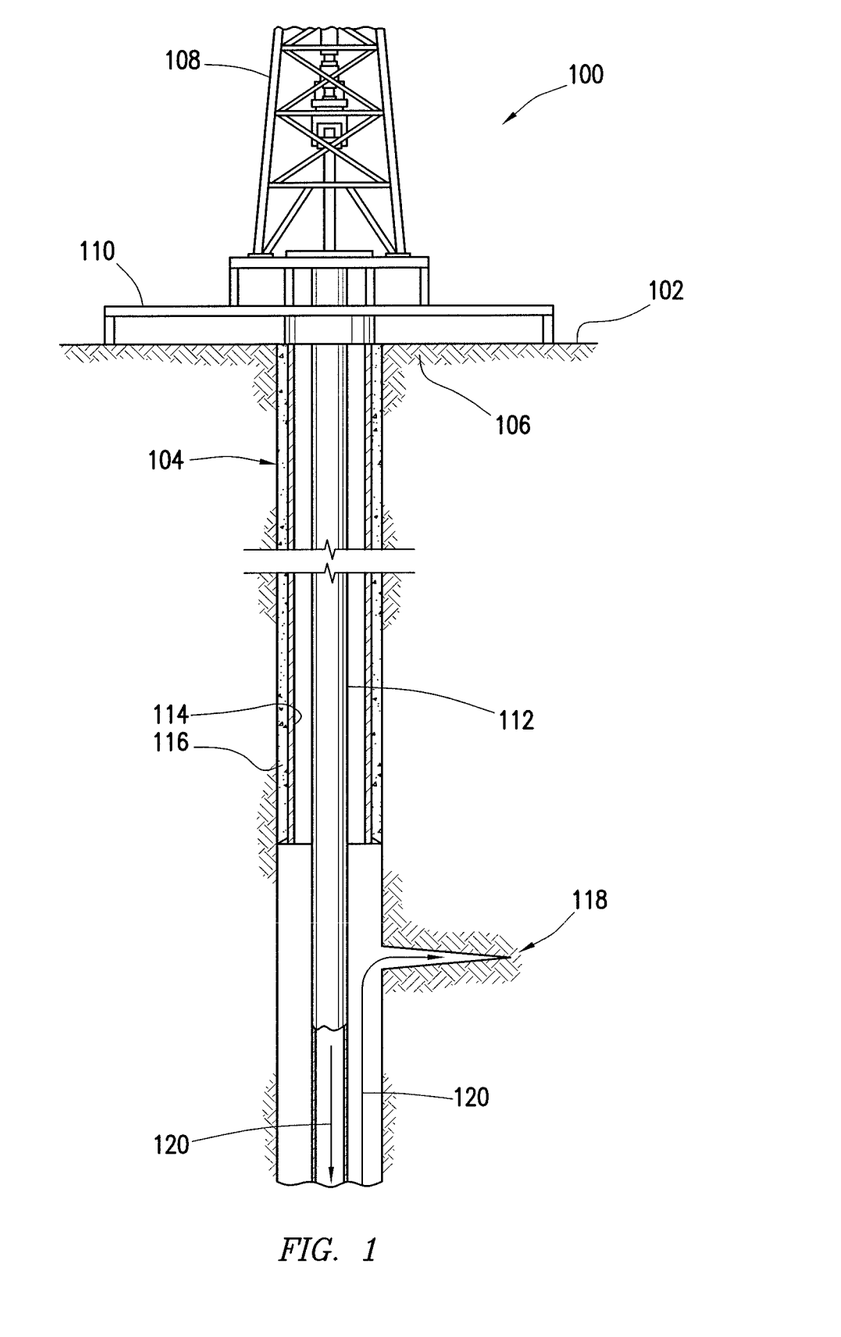
FIG. 1 illustrates an embodiment of the introduction of a lost circulation compositions into a lost circulation zone within a wellbore penetrating a subterranean formation.

Turning now to FIG. 1, an example operating environment for the methods and compositions described herein is shown. It should be noted that while FIG. 1 generally depicts a land-based operation, those skilled in the art should readily recognize that the principles described herein are equally applicable to subsea operations that employ floating or sea-based platforms and rigs, without departing from the scope of the disclosure. As illustrated, a drilling rig 100 may be positioned on the Earth's surface 102 extending over and around a wellbore 104 that penetrates a subterranean formation 106. While the wellbore 104 is shown extending generally vertically into the subterranean formation 106, the principles described herein are also applicable to wellbores that extend at an angle through the subterranean formation 106, such as horizontal and slanted wellbores. The wellbore 104 may be drilled into the subterranean formation 106 using any suitable drilling technique. In an embodiment, the drilling rig 100 comprises a derrick 108 with a rig floor 110 through which a work string 112 extends downward from the drilling rig 100 into the wellbore 104. Work string 112 may be any such string, casing, or tubular through which a fluid may flow. While not shown, the work string 112 may a deliver a wellbore servicing apparatus (e.g., a drill bit) or some part thereof to a predetermined depth within the wellbore 104. In some embodiments, at least a portion of the wellbore 104 may be lined with a casing 114 that may be secured into position in the wellbore 104 using cement 116. In alternative embodiments, the wellbore 104 may be partially cased and cemented thereby resulting in a portion of the wellbore 104 being openhole.

During any one or more wellbore drilling, completion, or servicing operations, a lost circulation zone 118 may be encountered. Where the lost circulation zone 118 is encountered, it may be desirable to employ the lost circulation compositions disclosed herein to prevent, lessen, minimize, and/or cease the loss of fluids to the lost circulation zone 118. Placement of a lost circulation composition into the lost circulation zone 118 may be an effective means of plugging or sealing off the lost circulation zone 118 and thereby preventing, ceasing, and/or substantially lessening the loss of fluids from the wellbore 104 to the lost circulation zone 118. While the lost circulation zone 118 is shown as an opening that extends from the wellbore 104 into the subterranean formation 106, it is contemplated that the lost circulation zone 118 may contain one or more features including, without limitation, fractures (natural or pre-existing), cracks, vugs, channels, openings, and/or the like. Moreover, while the lost circulation zone 118 is illustrated in an openhole section of the wellbore 104, it is contemplated that a lost circulation zone may also occur in a section of the wellbore 104 with the casing 114.

As discussed, lost circulation zone 118 may be bridged with the lost circulation compositions described herein. The lost circulation compositions may be provided in a weighted or unweighted "pill" as represented by arrow 120 for introduction into the wellbore. Such pills typically comprise the lost circulation materials, including the water-swellable starch graft copolymer, blended with a small amount of carrier fluid. The amount of the lost circulation materials used in the pill will depend on the size of the lost circulation zone 118 to be treated. Multiple pills or treatments may be used if needed. Drilling may be stopped while the pill is introduced into and circulated in the wellbore 104. As illustrated in FIG. 1, the pill, as represented by arrow 120, may be pumped into wellbore 104 via work string 112, which exits below lost circulation zone 118. The pill 120 may be pumped up the wellbore annulus where it may enter lost circulation zone 118. Once spotted into place, the pill 120 may prevent or retard the entry of drilling or other wellbore fluids. Pressure may be used to squeeze the pill into the lost circulation zone 118. Alternatively, a lost circulation composition may be added to the drilling fluid and circulated with the drilling fluid during drilling or servicing of the well. The water-swellable starch graft copolymer within the pill 120 may swell after contact with water in the wellbore or water placed in the wellbore. The swelling may enhance the ability of the pill 120 to prevent, cease, and/or substantially lessen the loss of fluids from the wellbore 104 to the lost circulation zone 118. If it is desirable to remove at least a portion of the pill 120, for example, if the pill 120 is interfering with a producing zone, the pill 120 may be exposed to acid. Once exposed, at least a portion of the pill 120 may dissolve.

Figure 2:
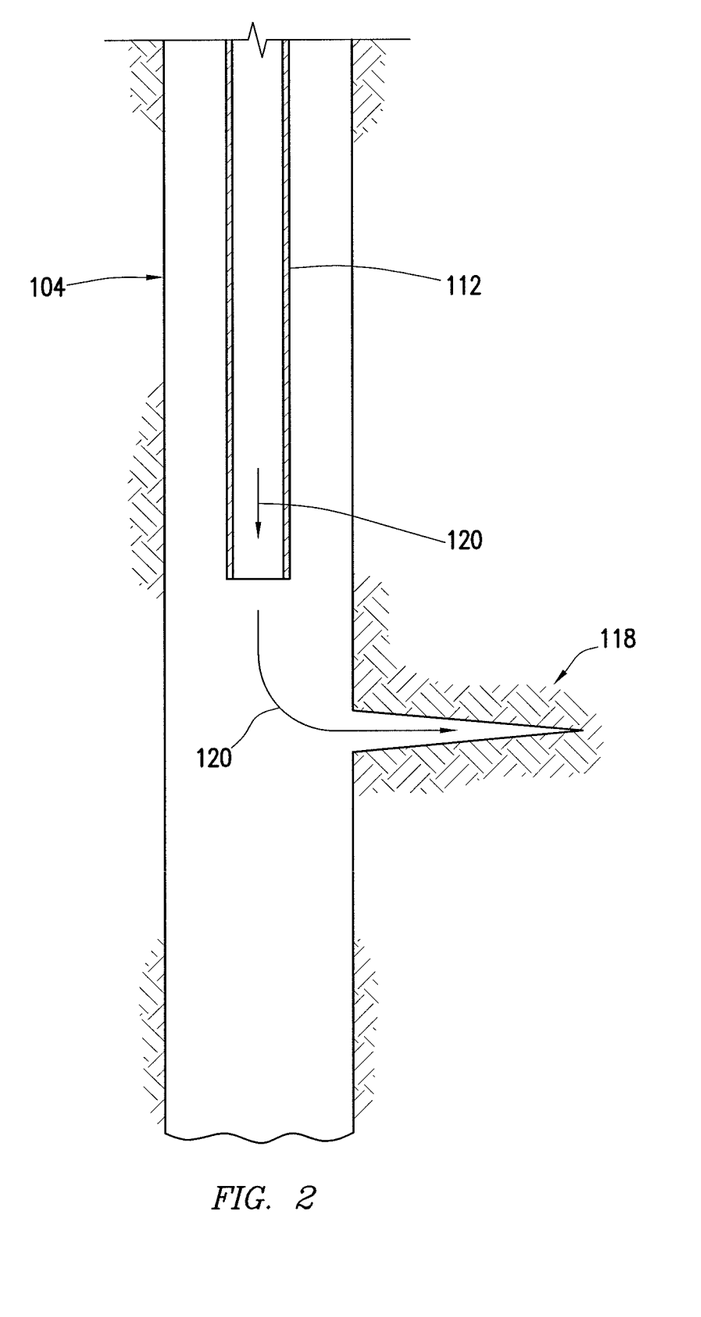
FIG. 2 illustrates another embodiment of the introduction of a lost circulation compositions into a lost circulation zone within a wellbore penetrating a subterranean formation.

Turning now to FIG. 2, the lost circulation compositions may be placed in the lost circulation zone 118 by work string 112, which for this example, exits above lost circulation zone 118. Optionally a plug, not shown, may be placed below the lost circulation zone 118. The pill, represented by arrow 120, may be pumped into a portion of the wellbore 114 near, proximate to, or within the lost circulation zone 118. At least a portion of the pill 120 may enter into the lost circulation zone 118 to prevent, cease, and/or substantially lessen the loss of fluids from the wellbore 104 to the lost circulation zone 118. In some alternative examples, the pill 120 may be pumped through a drill bit, not shown, however care should be used with this process so that the pill 120 does not block openings in the drill bit. The water-swellable starch graft copolymer within the pill 1220 may swell after contact with water in the wellbore or water placed in the wellbore. The swelling may enhance the ability of the pill 120 to prevent, cease, and/or substantially lessen the loss of fluids from the wellbore 104 to the lost circulation zone 118. If it is desirable to remove at least a portion of the pill 120, for example, if the pill is interfering with a producing zone, the pill 120 may be exposed to acid. Once exposed, at least a portion of the pill 120 may dissolve.

Figure 3:
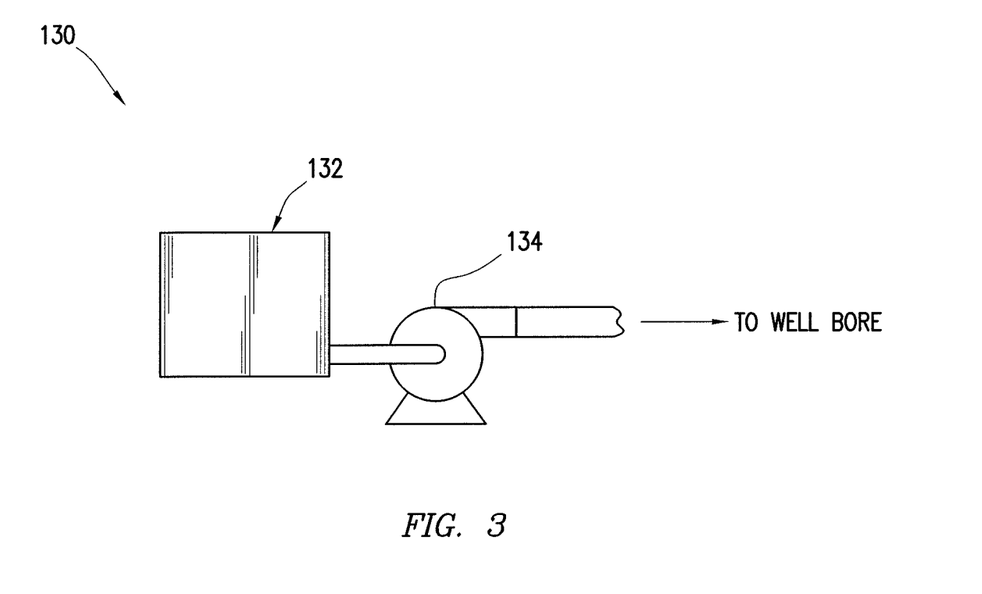
FIG. 3 illustrates a system for the preparation and delivery of a lost circulation composition into a wellbore in accordance with certain embodiments.

Turning now to FIG. 3, a system 130 is illustrated that may be used in placement of a lost circulation composition or particular portion thereof into a wellbore 118 in accordance with some of the examples described herein. As shown, the lost circulation composition (or a portion thereof) may be mixed in mixing equipment 132, such as a hopper, jet mixer, re-circulating mixer, or a batch mixer, for example, and then pumped via pumping equipment 134 to the wellbore 118. In some embodiments, the mixing equipment 132 and the pumping equipment 134 may be disposed on one or more cement trucks as should be apparent to those of ordinary skill in the art. While not shown separately, in embodiments, the mixing equipment 132 may comprise one or more of a circulating pump, a liquid additive system, an additive tank, and/or a storage tank.

The exemplary lost circulation compositions disclosed herein may directly or indirectly affect one or more components or pieces of equipment associated with the preparation, delivery, recapture, recycling, reuse, and/or disposal of the disclosed lost circulation compositions. For example, the disclosed lost circulation compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary lost circulation compositions. The disclosed lost circulation compositions may also directly or indirectly affect any transport or delivery equipment used to convey the lost circulation compositions to a well site or downhole such as, for example, any transport vessels, conduits, pipelines, trucks, tubulars, and/or pipes used to compositionally move the lost circulation compositions from one location to another, any pumps, compressors, or motors (e.g., topside or downhole) used to drive the lost circulation compositions into motion, any valves or related joints used to regulate the pressure or flow rate of the lost circulation compositions, and any sensors (i.e., pressure and temperature), gauges, and/or combinations thereof, and the like. The disclosed lost circulation compositions may also directly or indirectly affect the various downhole equipment and tools that may come into contact with the lost circulation compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of some specific embodiments are given. In no way should the following examples be read to limit, or to define, the scope of the invention.

EXAMPLE

The following series of tests were performed to compare the properties of the disclosed lost circulation compositions relative to a comparative lost circulation composition. Table 1 lists the components and amounts used to design both the experimental and comparative lost circulation compositions. The carrier fluid used in the lost circulation compositions was a viscosified aqueous base fluid. An aqueous fluid was used to induce swelling in the water-swellable starch graft copolymer. Lost Circulation Material A used in the lost circulation compositions was N-SEAL™ Lost Circulation Material available from Baroid Industrial Drilling Products, Inc., Houston, Tex. Lost Circulation Material B used in the lost circulation compositions was Oyster Shell Coarse. Lost Circulation Material C used in the lost circulation compositions was BARACARB® 1200 Bridging Agent available from Halliburton Energy Services, Inc., Houston, Tex. Lost Circulation Material D used in the lost circulation compositions was BARACARB® 600 Bridging Agent available from Halliburton Energy Services, Inc., Houston, Tex. Lost Circulation Material E used in the lost circulation compositions was BARACARB® 150 Bridging Agent available from Halliburton Energy Services, Inc., Houston, Tex. Lost Circulation Material F used in the lost circulation compositions was BARACARB® 25 Bridging Agent available from Halliburton Energy Services, Inc., Houston, Tex. The water-swellable starch graft copolymer used in the lost circulation compositions was a starch grafted onto a partially hydrated polyacrylamide.

The two compositions were used with a Permeability Plugging Apparatus (PPA) available from Farm® Instrument Company, Houston, Tex. in accordance with the API filtration test API described in Recommended Practice 13B-2, "Recommended Practice for Field Testing Oil Based Drilling Fluids." The PPA testing utilized 1524 and 2540 micron disks at a 1000 psi differential for 15 minutes at room temperature. The results are also presented in Table 1 below.

TABLE 1

| Component (lbs.) | Comparative | Experimental |
| --- | --- | --- |
| Carrier Fluid | 353.2 | 353.2 |
| Lost Circulation Material A | 22.5 | 22.5 |
| Lost Circulation Material B | 37.5 | 37.5 |
| Lost Circulation Material C | 15 | 15 |
| Lost Circulation Material D | 10 | 10 |
| Lost Circulation Material E | 10 | 10 |
| Lost Circulation Material F | 5 | 5 |
| Water-Swellable Grafted Copolymer | 0 | 5 |
| PPA Results - Micron Disks | | |
| 1524 | 16 mL | 5 mL |
| 2540 | 28 mL | 12.5 mL |

The results demonstrate that the experimental sample comprising the water-swellable grafted copolymer performed better than the comparative sample without the water-swellable starch graft copolymer. The experimental sample showed a significant decrease in fluid loss over the comparative sample.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A method for treating a lost circulation zone comprising:
provproviding a lost circulation composition comprising;
a lost circulation material comprising:
a water-swellable starch graft copolymer, wherein the water-swellable starch graft copolymer is cross-linked, wherein the water-swellable starch graft copolymer has a particle size of from about 1 mesh to about 200 mesh, wherein the water-swellable starch graft copolymer consists of a single type of monomer grafted onto a starch, wherein the monomer is selected from the group consisting of methacrylamide, 2-acrylamido-2-methyl-propanesulfonic acid, vinyl sulfonic acid, ethyl acrylate, and potassium acrylate, and wherein a weight ratio of the starch to the monomer is in the range of 1:1 to 1:6;
a carrier fluid, wherein the carrier fluid is present in an amount of from about 50% to about 80% by weight of the lost circulation composition; and
a viscosifier, wherein the viscosifier is present in an amount of about 0.1% to about 2% by weight of the lost circulation composition;
introducing the lost circulation composition into a wellbore within a subterranean formation, wherein the subterranean formation comprises a lost circulation zone;
placing the lost circulation composition into the lost circulation zone;
contacting the lost circulation material in the lost circulation zone with an acid and at least partially dissolving the lost circulation material with the acid; and
removing at least a portion of the lost circulation material from the lost circulation zone.

2. The method of claim 1 wherein the water-swellable graft copolymer comprises at least one starch selected from the group consisting of corn starches, waxy maize starches, wheat starches, potato starches, dextrin starches, dextran starches, corn meal, peeled yucca root, unpeeled yucca root, oat flour, banana flour, tapioca flour, and combinations thereof.

3. The method of claim 1 wherein the water-swellable starch graft copolymer is up to about 40% acid-soluble.

4. The method of claim 1 wherein the carrier fluid is selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof.

5. The method of claim 1 wherein the water-swellable starch graft copolymer has a multi-modal particle size distribution.

6. The method of claim 1 wherein the viscosifier is selected from the group consisting of colloidal agents, emulsion-forming agents, diatomaceous earth, biopolymers, synthetic polymers, chitosans, starches, gelatins, and combinations thereof.

7. The method of claim 1 wherein the lost circulation composition further comprise at least one additional lost circulation material selected from the group consisting of cedar bark, shredded cane stalks, mineral fiber, mica flakes, cellophane, ground rubber, polymeric materials, pieces of plastic, grounded marble, wood, nut hulls, plastic laminates, corncobs, cotton hulls, and combinations thereof.

8. The method of claim 1 wherein the lost circulation composition further comprises an acid-soluble filler selected from the group consisting of dolomite, magnesium carbonate, calcium carbonate, zinc carbonate, and combinations thereof.

9. The method of claim 1 wherein the lost circulation zone is in a producing zone.

10. The method of claim 1 wherein the acid is at least one of formic acid or hydrochloric acid.

11. The method of claim 8, wherein the acid soluble filler is present in an amount of about 15 wt. % to about 50 wt. % by weight of the lost circulation material.

* * * * *